US012234958B2

(12) United States Patent
Courcier et al.

(10) Patent No.: US 12,234,958 B2
(45) Date of Patent: Feb. 25, 2025

(54) OPTICAL MODULE OF A MOTOR VEHICLE LIGHTING SYSTEM

(71) Applicant: VALEO VISION, Bobigny (FR)

(72) Inventors: Marine Courcier, Unterfochring (DE); Aleksandra Cvetkovic, Unterfochring (DE); Eric Moisy, Unterfochring (DE); Stefan Namyslo, Unterfochring (DE); Pierre Albou, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/553,662

(22) PCT Filed: Apr. 1, 2022

(86) PCT No.: PCT/EP2022/058819
§ 371 (c)(1),
(2) Date: Oct. 2, 2023

(87) PCT Pub. No.: WO2022/207937
PCT Pub. Date: Oct. 6, 2022

(65) Prior Publication Data
US 2024/0183506 A1 Jun. 6, 2024

(30) Foreign Application Priority Data
Apr. 1, 2021 (FR) ...................... 2103383

(51) Int. Cl.
*F21S 41/25* (2018.01)
*B60Q 1/38* (2006.01)
(Continued)

(52) U.S. Cl.
CPC ............ *F21S 41/25* (2018.01); *F21S 41/143* (2018.01); *F21S 41/24* (2018.01); *F21S 43/14* (2018.01);
(Continued)

(58) Field of Classification Search
CPC ......... F21S 43/247; F21S 41/24; F21S 41/143
See application file for complete search history.

(56) References Cited

U.S. PATENT DOCUMENTS 9,611,996 B2    4/2017  Brendle
10,632,901 B2   4/2020  Danner et al.
(Continued)

FOREIGN PATENT DOCUMENTS

JP    2014-235787 A    12/2014
JP    2017-199558 A    11/2017
(Continued)

OTHER PUBLICATIONS

European Patent Office, International Search Report (with English translation) and Written Opinion of corresponding International Application No. PCT/EP2022/058819, dated Jul. 4, 2022.
(Continued)

*Primary Examiner* — Eric T Eide
(74) *Attorney, Agent, or Firm* — Valeo Vision

(57) ABSTRACT

The invention relates to an optical module of a motor vehicle lighting system, including at least one light source, a primary optical element comprising at least one primary optical member connected to an exit optical member, the primary optical member including a light entry face and a junction face connecting the primary optical member to the exit optical member, the primary optical element being a one-piece component, and an optical projection system designed to project, onto the ground, using light emitted by the light source and collected by the primary optical member, an image of the junction face, the primary optical member being arranged so that the image of its junction face that is projected onto the ground by the optical projection system is entirely bounded by substantially sharp edges.

12 Claims, 3 Drawing Sheets

(51) Int. Cl.
*F21S 41/143* (2018.01)
*F21S 41/24* (2018.01)
*F21S 43/14* (2018.01)
*F21S 43/20* (2018.01)
*F21S 43/235* (2018.01)
*F21W 104/00* (2018.01)

(52) U.S. Cl.
CPC ............. *F21S 43/235* (2018.01); *F21S 43/26* (2018.01); *B60Q 1/381* (2022.05); *B60Q 2400/50* (2013.01); *F21W 2104/00* (2018.01)

(56) References Cited

U.S. PATENT DOCUMENTS

| | | | |
|---|---|---|---|
| 10,829,036 B2 | 11/2020 | Sugiyama et al. | |
| 10,955,102 B1* | 3/2021 | Lee | F21S 41/151 |
| 2015/0124469 A1* | 5/2015 | Krenn | F21S 41/29 |
| | | | 362/511 |
| 2015/0131305 A1* | 5/2015 | Courcier | F21S 41/322 |
| | | | 362/516 |
| 2015/0226395 A1* | 8/2015 | Taudt | F21S 41/25 |
| | | | 362/511 |
| 2018/0087732 A1* | 3/2018 | De Lamberterie | F21S 41/26 |
| 2019/0234572 A1* | 8/2019 | Courcier | F21S 41/265 |

FOREIGN PATENT DOCUMENTS

| | | |
|---|---|---|
| JP | 2020102332 A | 7/2020 |
| WO | 2012068603 A1 | 5/2012 |
| WO | 2014019912 A1 | 2/2014 |
| WO | 2021052837 A1 | 3/2021 |

OTHER PUBLICATIONS

Japan Patent Office, Office Action of corresponding Japanese Patent Application No. JP2023-560616, dated Dec. 3, 2024.

* cited by examiner

OPTICAL MODULE OF A MOTOR VEHICLE LIGHTING SYSTEM

TECHNICAL FIELD

The invention relates to the field of luminous systems of motor vehicles. More specifically, the invention relates to an optical module of a luminous system of a motor vehicle.

BACKGROUND OF THE INVENTION

In the field of luminous lighting and signaling of motor vehicles, it is known to perform, in addition to the conventional functions, functions of projecting onto the ground a logo or light patterns, in the field near the vehicle. This type of function may for example intervene in the context of driving assistance, for example by producing a marking on the ground that makes it possible to materialize a traffic lane. This type of function may also intervene in support of a conventional signaling function, in order to warn another road user of a change in trajectory.

In order to project the pattern or the light logo onto the ground, one known solution consists in introducing dark zones into a pixelated light beam emitted by a luminous system of the motor vehicle, the driver or the road user thus viewing the pattern or the logo through contrast between dark zones and lit zones. However, this solution requires the light beam to have a particularly high resolution and therefore requires a particularly high number of light sources, and this makes the luminous system expensive and complex.

Another known solution consists in protecting the light emitted by a light source through a perforated mask of an opening of which the contour corresponds to that of the pattern or logo that it is desired to project onto the ground. Although this solution is much less ex-pensive than the preceding one, it is not effective since a large part of the light is blocked or absorbed by the mask.

There is thus a need for an optical module that makes it possible to project onto the ground a pattern or a light logo, which has a reasonable cost and is effective.

The present invention falls within this context and aims to meet this need.

BRIEF SUMMARY OF THE INVENTION

One subject of the invention is thus an optical module of a luminous system of a motor vehicle, comprising:
a. at least one selectively controllable light source,
b. a primary optical element comprising at least one primary optical member connected to an output optical member, said primary optical member having a light input face facing which is disposed said light source, and a junction face connecting said primary optical member to the output optical member, the primary optical element being a one-piece component, and
c. an optical projection system arranged to project onto the ground, using the light emitted by said light source and collected by said primary optical member, an image of said junction face of this primary optical member, said primary optical member being arranged so that the image of its junction face that is projected onto the ground by the optical projection system is entirely delimited by substantially sharp edges.

In the invention, the primary optical member is connected to the output optical member by its junction face, the light emitted by the light source through the input face of this primary optical member and propagating in this primary optical member thus entering the output optical member via this junction face, which thus forms an imaginary output face of the primary optical member. All the light emitted by the light source and collected by this primary optical member is thus exploited so as to form, at the junction face of this member, a pattern defined beforehand and corresponding substantially to the pattern that it is desired to materialize on the ground. Since the primary optical element is a one-piece component, this light undergoes little or no deflection during its passage from the primary optical member to the output optical member. It should be noted that this output member makes it possible, inter alia, to provide a plinth for holding the primary optical member, which does not impact the optical performance of the module, or may even contribute to improving it. An image of this pattern may thus be projected onto the ground by the optical projection system without its sharpness, which is defined substantially by the primary optical member, being impacted by the output optical member. The invention thus makes it possible, for an acceptable number of elements and therefore a reasonable cost and complexity, to project onto the ground a pattern or a light logo, using the light emitted by a light source in an optimal manner.

In the present invention, the light pattern forms a logo, a pictogram, a geometric pattern or a set of a plurality of logos, pictograms or geometric patterns and combinations there-of, such as for example a pictogram associated with one or more geometric patterns. Advantageously, a geometric pattern will be chosen of which the shape is well known, such as any polygon or a regular polygon, chevrons, triangles or disks.

In the invention, "substantially sharp edge of an image projected onto the ground" is understood to mean the fact that the variation in the illumination on the ground caused by this projection, between two points situated on either side of this edge in a direction substantially perpendicular to the edge and separated by at least 1 cm, has a slope, in particular at least one point, greater than or equal to 10 lux/cm.

Advantageously, the optical module comprises:
a. a plurality of selectively controllable light sources,
b. a primary optical element comprising a plurality of primary optical members connected to one and the same output optical member, each primary optical member having a light input face facing which is disposed one of said light sources, and a junction face connecting said primary optical member to the output optical member, the primary optical element being a one-piece component, and
c. an optical projection system arranged to project onto the ground, using the light emitted by each of the light sources and collected by each primary optical member, an image of each of the junction faces of these primary optical members, each primary optical member being arranged so that the image of its junction face that is projected onto the ground by the optical projection system is entirely delimited by substantially sharp edges.

In one exemplary embodiment of the invention, the optical projection system is arranged to project onto the ground, in a field near the vehicle, the images of the junction faces that are projected onto the ground by the optical projection system. "Near field" means a projection distance of less than 10 meters, in particular less than 5 meters and/or an overall projection direction forming an angle of at least 5° below the horizontal, in particular at least 10° below the horizontal. These images may thus contribute to performing a function of indication of a trajectory taken by the vehicle, and in particular of the direction indicator or reversing light type.

Preferably, each selectively controllable light source has a light-emitting semiconductor chip, in particular a light-emitting diode. Still preferably, each selectively controllable light source is able to emit white-colored light. As a variant, each selectively controllable light source is able to emit amber-colored light. Again as a variant, each selectively controllable light source is able to emit light of which the color is controllable.

In one embodiment of the invention, said, in particular each, primary optical member has a primary light guide. If appropriate, the input face of said, in particular of each, light guide may be connected to the junction face of said light guide by an envelope such that each point of the contour of the input face is connected to a point of the contour of the junction face by a straight line. In other words, the envelope of the light guide is a developable surface. According to this feature, the light emitted by a light source through the input face of a primary optical member propagates in this primary optical member by total internal reflection on the walls of the light guide until it reaches the junction face. The fact that the envelope is a developable surface makes it possible to form, at the junction face, a pattern that is entirely delimited by substantially sharp edges.

Advantageously, the input face of said, in particular of each, primary optical member is substantially rectangular. If appropriate, the junction face of said primary optical member has a shape substantially different from that of the input face of said primary optical member. According to this feature, each primary optical member may be optimized so as to obtain, at its junction face, a pattern of predetermined shape corresponding to the shape of this junction face, which may be distinct from one primary optical member to another, and which may be projected onto the ground in the sharpest manner possible by the optical projection system.

As a variant, the input face of said primary optical member may have a shape and/or an orientation adapted to the contour of the pattern formed at the junction face of said primary optical member and arranged such that the distribution of light in this contour is substantially uniform. For example, said input face may have a half-disk or rhombus or deformed rectangle shape. Preferably, said junction face may have a number of edges that is different from that of said input face and/or edges with dimensions that are distinct from those of the edges of said input face and/or angles between the edges that are distinct from those between the edges of said input face. In particular, the shape of said junction face may be distinct from any shape able to be obtained by homothetic transformation of the shape of said input face. For example, said junction face may be substantially triangular, trapezoidal, or in the shape of a rhombus or pentagon.

If desired, at least two input faces of two primary optical members have orientations that are distinct from one another.

In an alternative or cumulative embodiment, the module has an opaque shield disposed upstream of the output optical member and having at least one opening, in particular a plurality of openings, said, in particular each, primary optical member extending through said opening, in particular through one of said openings. Preferably, each opening is arranged such that its contour borders the primary optical member passing through it. This shield makes it possible to block or absorb parasitic light rays that may escape from the primary optical members before the junction face and enter the output optical member, and therefore to prevent these parasitic rays from being projected onto the ground by the optical projection system, which would form unwanted light spots.

Advantageously, the primary optical members are arranged one above another. For example, the primary optical members are arranged such that the image of the junction face of an upper primary optical element is projected onto the ground, by the optical projection system, upstream or downstream of the image of the junction face of a lower primary optical element arranged below this upper primary optical element. As a variant, the primary optical members may be arranged next to one another, along a horizontal axis.

According to one exemplary embodiment of the invention, the primary optical members are connected to the output optical member such that the junction faces, with the output optical member, of at least two adjacent primary optical members are spaced apart from one another. According to this feature, it is thus possible to generate a space between the images of the junction faces of these two adjacent primary optical members, the space being delimited sharply on the ground by the edges of these images.

According to another exemplary embodiment of the invention, which is cumulative or alternative, at least two primary optical members meet one another upstream of their junction faces, so as to be connected together to the output optical member by one and the same junction face. This feature makes it possible to project onto the ground a pattern that is particularly long, such as a long line, which is not possible with a single primary optical member. The dimensions of the junction face in the case of a single primary optical member for producing such a pattern mean that the rays emitted by the light source in the input face of this member and intended to form the ends of this line exhibit an angle such that they will not be projected by the optical projection system. By contrast, the combination of a plurality of primary optical members for obtaining a single junction face makes it possible to obtain a pattern of large dimensions that is uniform.

Advantageously, the output optical member has an output face substantially in the shape of a smooth dome. For example, the output optical member may be a truncated ball portion or, as a variation, a truncated cylinder portion. This feature makes it possible to provide the output optical member with a function of correction of the geometric aberrations introduced by the optical projection system during the projection onto the ground of said images of the junction faces.

Preferably, the respective refractive indices of the primary optical members and of the output optical member are substantially identical. For example, the primary optical members and the output optical member are manufactured from one and the same material, and are in particular produced from one and the same polymer. "Same material" is understood to mean that the primary optical members and the output optical member are made from materials that are at least produced from one and the same base polymer, for example polycarbonate (or PC) or PMMA. However, these materials may have different fillers. Preferably, the primary optical members and the output optical member may be produced in a single mold so as to form the primary optical element, this primary optical element thus being a single component.

As a variant, one or more, or even all, of the primary optical members and the output optical member may be produced in distinct molds, then being assembled so as to form the primary optical element. If appropriate, said primary optical members produced in molds that are distinct from that of the output optical member may be adhesively bonded to the output optical member by means of an adhesive with a refractive index substantially identical to those of these primary optical members and the output optical member.

For example, the output optical member may have a notch formed in an upstream face opposite the output face, at least one primary optical member having a base intended to be inserted into said notch such that a downstream face of the base faces the notch and forms the junction face of this primary optical member. In this example, it is thus possible for one of the primary optical members to be manufactured independently of the output optical member, while another primary optical member is produced with the output optical member, the notch making it possible to ensure that the junction faces of these primary optical members are coplanar.

According to another example, the set of the primary optical members forms a single component provided with a base to which the primary optical members are connected via their junction faces, this single component being joined to an output optical component such that a downstream face of the base faces an upstream face of the output optical component. If appropriate, the base and the output optical component together form the output optical member.

If desired, said one or more primary optical members produced in molds that are distinct from that of the output optical member may have fastening and positioning tabs that are intended to cooperate with the output optical member, for example with lips of the output optical member or with complementary fastening tabs of the output optical member. These features make it possible to ensure the precision of the relative positioning of the output optical member with this or these primary optical members.

Advantageously, the optical projection system has a focal surface passing substantially through the junction face of said primary optical member with the output optical member, in particular through the junction faces of said primary optical members with the output optical member. For example, said focal surface may be a plane or a curved sur-face situated substantially at the junction plane between the junction surfaces and the output optical member.

For example, the optical projection system has at least one lens and/or at least one reflector and/or a combination of at least one lens and at least one reflector. Preferably, the optical projection system may have a single projection lens of which the focal surface passes substantially through the junction surfaces of the primary optical members with the output optical member. It should be noted that the term "substantially" corresponds to an offset of a few millimeters between the focal surface and the junction surfaces, which makes it possible to take into account a defocusing introduced by the output face of the output optical member. As a variant, the optical projection system may have a substantially planar mirror arranged so as to form virtual images of the junction surfaces on one side of this substantially planar mirror and a projection lens situated on the other side of this substantially planar mirror and of which the focal surface passes substantially through these virtual images. This type of optical projection system makes it possible to substantially reduce the bulk of the optical module.

Another subject of the invention is a luminous system of a motor vehicle, comprising an optical module according to the invention, and a control unit for the light sources of said optical module.

For example, said luminous system may have a luminous device of the motor vehicle tail light and/or motor vehicle front headlight type, and/or a luminous device arranged in a bumper of a motor vehicle and/or in a rearview mirror of a motor vehicle, the optical module being arranged in this luminous device.

Advantageously, the control unit is able to selectively control each of the light sources of said optical module as a function of an instruction received from a computer of the motor vehicle.

According to one example, the luminous system may have an additional optical module comprising at least one additional light source and able to emit a signaling light beam, which is in particular regulatory, and the control unit may be arranged, as a function of an instruction received from a computer of the motor vehicle, to control, in a synchronized manner, said additional light source of the additional optical module and said light sources of the optical module.

For example, the additional optical module may be able to emit a light beam of the regulatory direction indicator type and the control unit may be arranged, as a function of an instruction received from a computer of the motor vehicle, to control the emission of said light beam by the additional light source intermittently and to control the emission of light by each of the light sources of the optical module simultaneously with the emission of said light beam.

According to another example, the additional optical module may have a plurality of additional light sources and may be able to perform a function of the regulatory sequential direction indicator type, and the control unit may be arranged, as a function of an instruction received from a computer of the motor vehicle, to control the sequential and/or progressive emission of light beams by the additional light sources and to control the emission of light by each of the light sources sequentially and/or progressively and synchronously with the sequential and/or progressive emission of said light beams.

BRIEF DESCRIPTION OF THE DRAWINGS

The present invention is now described using examples that merely illustrate and in no way limit the scope of the invention, and on the basis of the appended drawings, in which drawings the various figures depict.

DETAILED DESCRIPTION OF THE INVENTION

In the following description, elements that are identical in structure or in function and appear in different figures keep the same references, unless otherwise stated.

Figure 1:
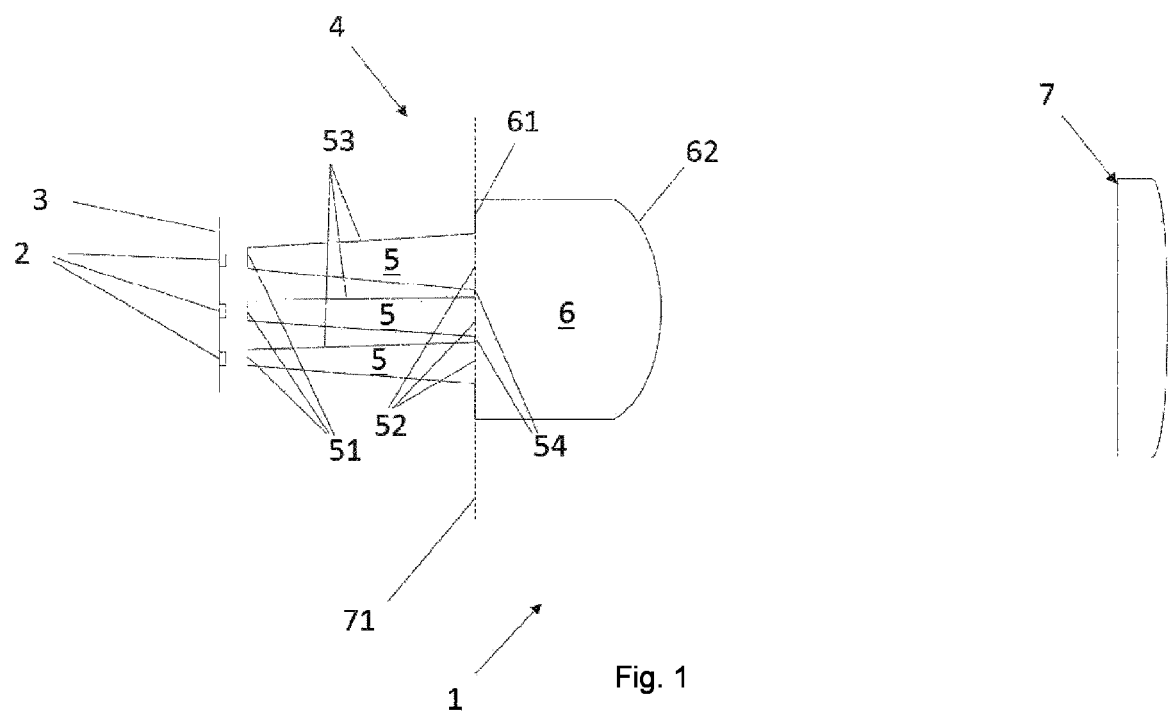
FIG. 1 schematically and partially depicts a cross-sectional view of an optical module according to one embodiment of the invention.

FIG. 1 depicts an optical module 1 of a luminous system of a motor vehicle according to a first embodiment of the invention.

The optical module 1 has a plurality of light-emitting diodes 2 mounted on one and the same printed circuit board 3. In the example described, the optical module 1 has three LEDs 2 that can each be controlled independently of the others so as to emit white-colored light.

The optical module 1 has a primary optical element 4 arranged downstream of the light-emitting diodes 2. This primary optical element 4 will be described in connection with FIG. 2, which shows this element 4 in a rear perspective view.

The primary optical element 4 has a plurality of primary optical members 5 and an output optical member 6 to which these primary optical members 5 are connected. In the example described, the primary optical element 4 has three primary optical members 5, each produced in the form of a light guide. The primary optical members 5 are arranged one above another.

Each light guide 5 has an input face 51, facing which is disposed one of the LEDs 2, the light able to be emitted by this LED 2 thus entering the light guide 5 via this input face 51.

Each light guide 5 is connected to the output optical member 6 by a junction face 52, which is opposite the input face 51 and situated at an upstream wall 61 of the output optical members 6.

For each light guide 5, the input face 51 is connected to the junction face 52 by an envelope 53. This envelope 53 is a developable surface, such that each point of the contour of the input face 51 is connected, via the envelope 53, to a point of the contour of the junction face 52 by a straight line. The light able to be emitted by the LED 2 situated facing the input face 51 is thus coupled to the light guide 5, when it enters this light guide 5 via this input face 51, and propagates via successive internal total reflections against the envelope 53 until it reaches the junction face 52, via which it is decoupled from the light guide 5 and enters the output optical face 6. The junction face 52 thus forms an imaginary output face of the light guide 5.

Figure 2:
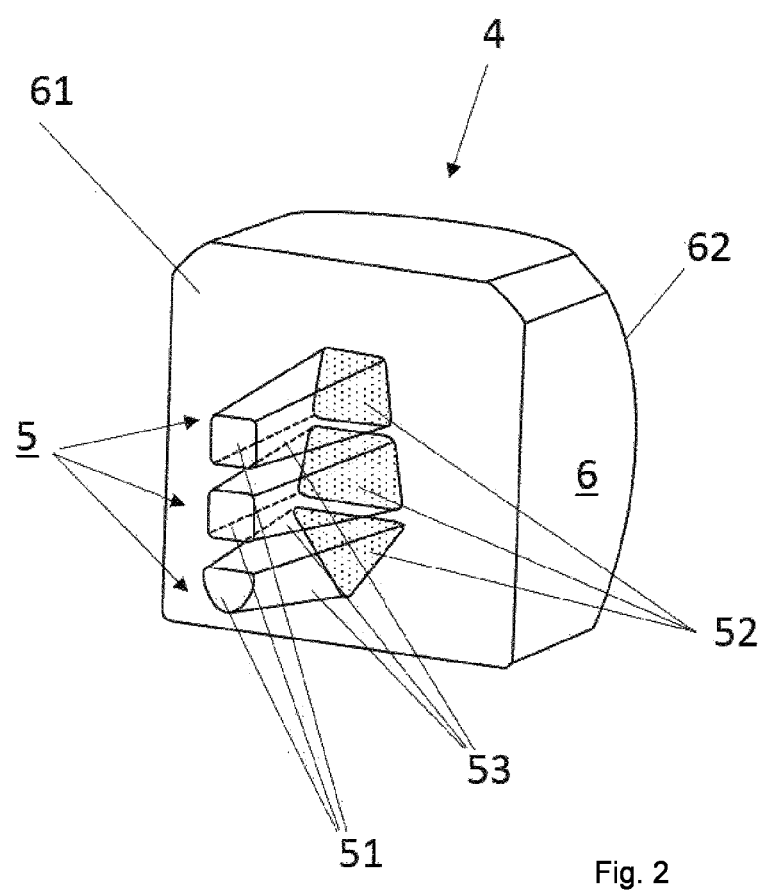
FIG. 2 schematically and partially depicts a perspective view of the primary optical element of the module in FIG. 1.

As can be seen in FIG. 2, the input faces 51 of the light guides 5 may be distinct from one another. In the example described, the input face 51 of the lower light guide has a semicircular shape, while the input faces 51 of the central and upper light guides are rectangular. It is possible to imagine shapes other than those described, and in particular rhombus or deformed rectangle shapes, without departing from the scope of the present invention. Likewise, it is possible to imagine that all the shapes of the input faces 51 are distinct from one another or else that the dimensions of only some or of all of the input faces 51 are distinct from one another or else that the orientations of only some or of all of the input faces 51 are distinct from one another, without departing from the scope of the present invention. As will be described below, the choice of the shape of the input face 51 of a light guide 5 is principally linked to the shape of the junction face 52 of this guide 5 and to the distribution of light desired at this junction face 52.

Likewise, the junction faces 52 of the light guides 5 may be distinct from one another and the junction face 52 of each light guide 5 is distinct from the input face 51 of this light guide 5. The junction face 52 of a light guide 5 thus defines, by virtue of its contour, a pattern of which the shape is predetermined and specific to this light guide 5. The shape of the input face 51 and the envelope 53 of each light guide 5 thus makes it possible to exploit all the light emitted by an LED 2 through the input face 51 so as to obtain at the junction face 52 a pattern that is entirely delimited by substantially sharp edges. Likewise, the shape of the input face 51 and the envelope 53 make it possible to obtain a uniform distribution of light inside this pattern, at the junction face 52.

In the example described, the junction face 52 of the lower light guide has a triangular shape, while the junction faces 52 of the central and upper light guides are trapezoidal, the dimensions of the junction face 52 of the upper guide being smaller than those of the junction face 52 of the central guide. It will be noted that the semicircular shape of the input face 51 of the lower guide is particularly suitable for obtaining a uniform distribution of light at the junction face 52 of this lower guide, and that the rectangular shapes of the input faces 51 of the central and upper light guides are particularly suitable for obtaining a uniform distribution of light at the junction faces 52 of these central and upper light guides.

Furthermore, the light guides 5 are arranged such that two adjacent junction faces 52 are spaced apart by a space 54.

The primary optical element 4 is a one-piece component, the light guides 5 and the output optical member 6 being manufactured from one and the same material, namely polycarbonate or Pc. In the example described, the primary optical element 4 is a component produced in a single mold. In other words, the refractive index of the light guides 5 and of the output optical member 6 is identical, and there is no diopter at the junction faces 52, such that the light entering the output optical member 6 from the light guides 5 undergoes no deflection at the junction faces 52.

The optical output member 6 has an output face 62, opposite the upstream face 61, in the shape of a smooth dome. More specifically, this output face 62 may be partially spherical, the output optical member 6 thus having a truncated ball shape. The output face 62 is in particular centered on the junction face 52 of the central light guide 5. As a result, the light coming from the junction faces 52 undergoes substantially no deflection during its exit from the primary optical member 4 via this output face 62. The output optical member 6 thus forms a mounting support for the light guides 5, and it is possible to arrange fastening elements of the primary optical element 4 on this output optical member 6.

The optical module 1 has an optical projection system 7. In the example in FIG. 1, the optical projection system 7 is a projection lens 7 having a focal plane 71 passing substantially through the junction surfaces 52 of the light guides 5.

This projection lens 7 is thus arranged to project onto the ground, in a near field, images of the junction faces 52. Since the patterns formed at the junction faces 52 are entirely delimited by sharp edges, as a result of the light guides 5, and the focal plane 71 passes through these junction faces 52, these images projected onto the ground are therefore themselves entirely delimited by sharp edges, corresponding to the edges of these junction faces 52, after inversion by the projection lens 7. It should be noted that a deformation is introduced during the projection of the images by the projection lens 7, if the projection is not performed perpendicular to the ground. However, in the case of a projection on a plane orthogonal to the optical axis of the optical module, the projected images indeed correspond to the junction faces 52.

Figure 3:
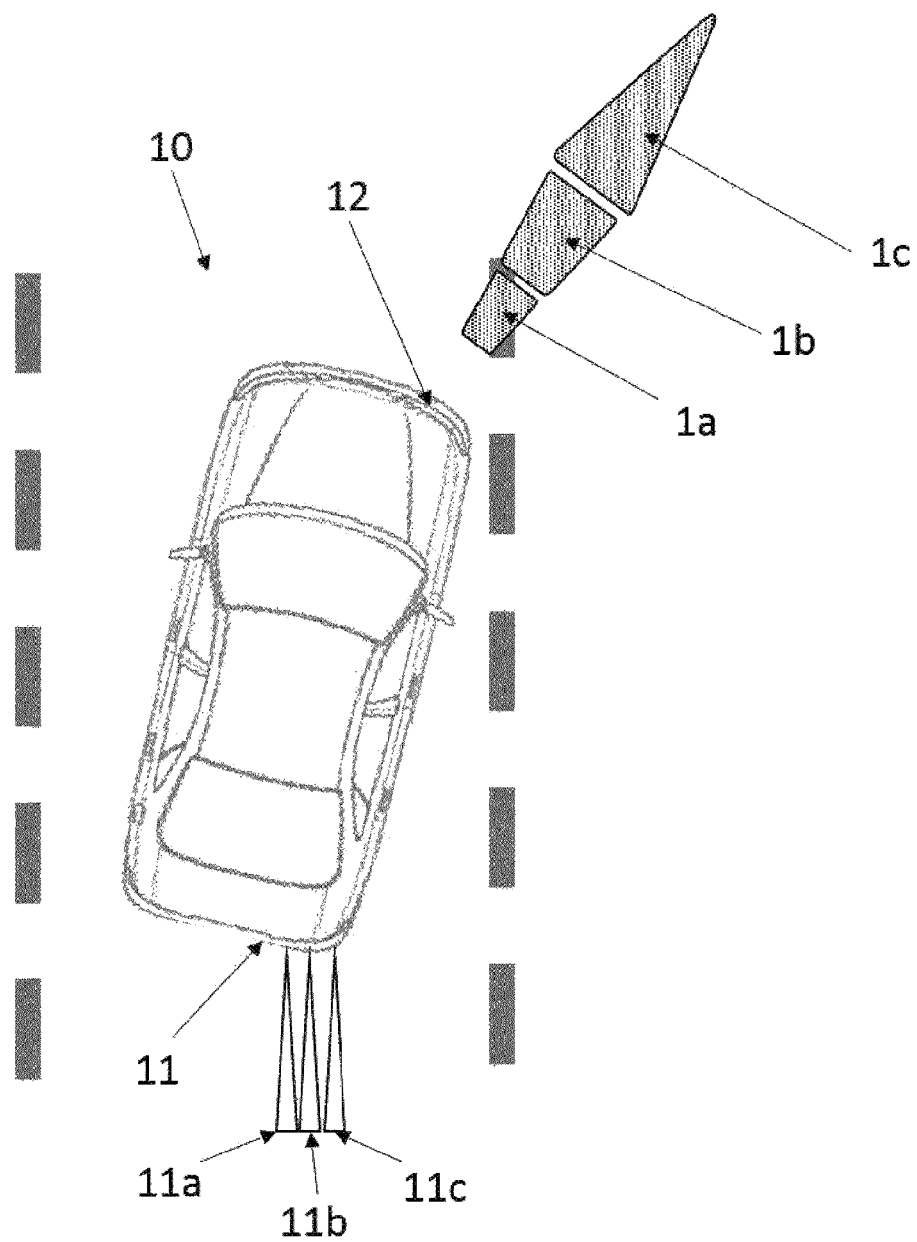
FIG. 3 schematically and partially depicts a luminous system for a motor vehicle according to one embodiment of the invention and incorporating the optical module in FIG. 1.

FIG. 3 describes a luminous system 10 of a motor vehicle according to an exemplary embodiment of the invention. The luminous system 10 has a tail light 11 and a front headlight 12. The tail light 11 has a plurality of light sources, which are not depicted and can be controlled independently of one another. The optical module 1 in FIG. 1 is arranged in the front headlight 12.

The luminous system 10 has a control unit (not depicted) receiving instructions from a computer of the motor vehicle so as to perform luminous functions, and controlling the light sources of the tail light 11 and the LEDs 2 of the optical module 1 as a function of these instructions.

Upon receiving an instruction to emit a function a sequential direction indicator type, for example generated by the computer during a change of lane of the motor vehicle, the control unit controls the light sources of the tail light 11 in a cyclic manner, each cycle consisting of the progressive emission of three light beams 11a, 11b, 11c from the inside toward the outside of the motor vehicle, followed by turning off of these three beams.

In parallel, for each cycle, the control unit activates the lower LED 2 simultaneously with the emission of the light beam 11a, the optical module 1 thus projecting onto the ground, in the field near the vehicle, the image 1a of the junction face 52 of the lower light guide 5. The control unit then activates the central LED 2 simultaneously with the emission of the light beam 11b, the optical module 1 thus projecting onto the ground, in the field near the vehicle, the image 1b of the junction face 52 of the central light guide 5, the lower LED 2 remaining activated. The control unit then activates the upper LED 2 simultaneously with the emission of the light beam 11c, the optical module 1 thus projecting onto the ground, in the field near the vehicle, the image 1c of the junction face 52 of the upper light guide 5, the lower and central LEDs 2 remaining activated. Finally, the control unit deactivates all the LEDs 2, simultaneously with the turning off of the light beams 11a, 11b and 11c.

It is thus understood that the optical module 1 thus performs a direction indicator function complementary to the sequential direction indicator function performed by the tail light 11. Since the images 1a, 1b and 1c are projected onto the ground, in the field near the vehicle, they are thus able to be perceived easily by a road user traveling in line with the motor vehicle. The arrangement of the light guides 5 one above another makes it possible to project these images 1a, 1b and 1c downstream of one another, the spaces 54 between the junction faces 52 making it possible to generate spaces between these images so as to further reinforce their sharpness.

Figure 4:
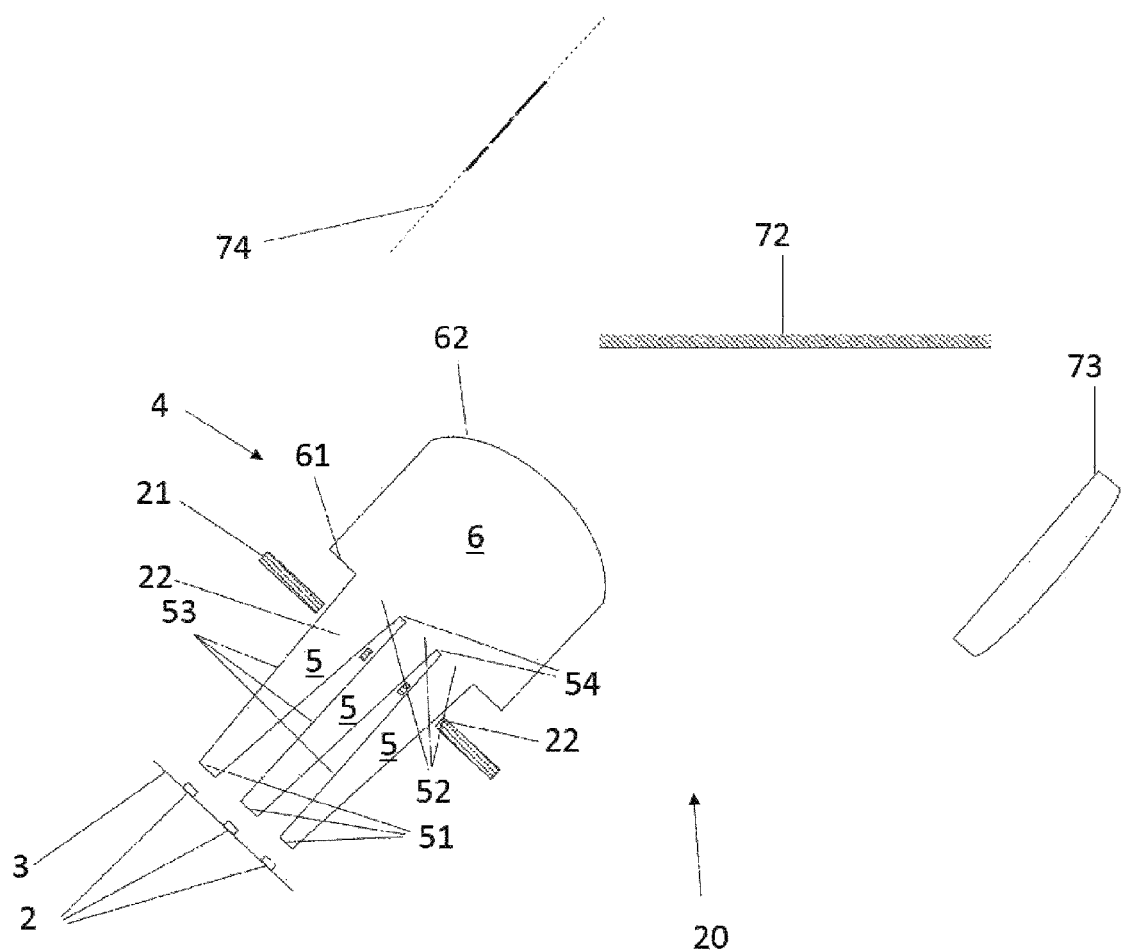
FIG. 4 schematically and partially depicts a view in cross section of an optical module according to another embodiment of the invention.

FIG. 4 depicts an optical module 20 of a luminous system of a motor vehicle according to a second embodiment of the invention.

In this example, the optical module 20 has, like in the example in FIG. 1, three LEDs 2 and a primary optical element 4 arranged downstream of the light-emitting diodes 2, the primary optical element 4 being in accordance with the example in FIG. 1 and FIG. 3.

The optical module 20 also has an opaque shield 21 disposed upstream of the upstream face 61 of the output optical member 6. This shield 21 has a plurality of openings 22, each light guide 5 passing through one of these openings 22. This shield 21 thus makes it possible to block the parasitic light rays that may escape from the light guides 5 before reaching the junction faces 52, so as to improve the sharpness of the edges of the patterns formed at these junction faces 52.

Furthermore, the optical module has an optical projection system 7 having both a planar mirror 72 and a projection lens 73.

The planar mirror 72 is arranged downstream of the output face 62 of the output optical member 6 and makes it possible to form virtual images of the junction surfaces 52 behind this planar mirror 72. The projection lens 73 is situated downstream of the planar mirror 72 and has a focal plane 74 passing substantially through the position of these virtual images, such that it can project onto the ground images of these virtual images.

The above description clearly explains how the invention makes it possible to achieve the objectives that it has set for itself, namely proposing an optical module that makes it possible to project onto the ground a pattern or a light logo, which has a reasonable cost and is effective, this optical module comprising a one-piece primary optical element combining primary optical members that are capable of forming sharp patterns and an output optical member that makes it possible to hold these primary optical members without impacting the optical performance of the module.

In any event, the invention is not limited to the embodiments specifically described in this document, and extends in particular to all equivalent means and to any technically operational combination of these means. It is in particular possible to envisage using types of light source other than those described, and in particular light sources that are able to emit light of a color other than white or light of which the color can be controlled. It is also possible to envisage shapes for the junction faces other than those described. It is also possible to envisage luminous functions other than those described, and in particular other functions of indication of a change of trajectory of a motor vehicle, such as reversing indicator or a change of lane indicator, driving assistance functions or else inter-vehicle communication functions.

What is claimed is:

1. An optical module of a luminous system for a motor vehicle, comprising:
   a. at least one selectively controllable light source,
   b. a primary optical element including at least one primary optical member connected to an output optical member, the primary optical member having a light input face facing which is disposed the light source, and a junction face connecting the primary optical member to the output optical member, the primary optical element being a one-piece component, and
   c. an optical projection system arranged to project onto the ground, using the light emitted by the light source and collected by the primary optical member, an image of the junction face of this primary optical member, the primary optical member being arranged so that the image of its junction face that is projected onto the ground by the optical projection system is entirely delimited by substantially sharp edges.

2. The optical module as claimed in claim 1, wherein the primary optical member has a primary light guide, the input face of the light guide being connected to the junction face of the light guide by an envelope such that each point of the contour of the input face is connected to a point of the contour of the junction face by a straight line.

3. The optical module as claimed in claim 1, wherein the input face of the primary optical member is substantially rectangular, and wherein the junction face of the primary optical member has a shape substantially different from that of the input face of the primary optical member.

4. The optical module as claimed in claim 1, further comprising an opaque shield disposed upstream of the output optical member and having at least one opening, with the primary optical member extending through the opening.

5. An optical module of a luminous system for a motor vehicle, comprising:
   a. a plurality of selectively controllable light sources, b. a primary optical element including a plurality of primary optical members connected to one and the same output optical member, each primary optical member having a light input face facing which is disposed one of the light sources, and a junction face connecting the primary optical member to the output optical member, the primary optical element being a one-piece component, and c. an optical projection system arranged to project onto the ground, using the light emitted by each of the light sources and collected by each primary optical member, an image of each of the junction faces of these primary optical members, each primary optical member being arranged so that the image of its junction face that is projected onto the ground by the optical projection system is entirely delimited by substantially sharp edges.

6. The optical module as claimed in claim 5, wherein the primary optical members are arranged one above another.

7. The optical module as claimed in claim 5, wherein the primary optical members are connected to the output optical member such that the junction faces, with the output optical member, of two adjacent primary optical members are spaced apart from one another.

8. The optical module as claimed in claim 5, wherein at least two primary optical members meet one another upstream of their junction faces, so as to be connected together to the output optical member by one and the same junction face.

9. The optical module as claimed in claim 1, wherein the output optical member has an output face substantially in the shape of a smooth dome.

10. The optical module as claimed in claim 1, wherein the optical projection system has a focal surface passing substantially through the junction face of the primary optical member with the output optical member.

11. The optical module as claimed in claim 10, wherein the optical projection system has at least one lens and/or at least one reflector and/or a combination of at least one lens and at least one reflector.

12. A luminous system of a motor vehicle, comprising an optical module and a control unit for the light sources of the optical module, with the optical module including:

at least one selectively controllable light source, a primary optical element including at least one primary optical member connected to an output optical member, the primary optical member having a light input face facing which is disposed the light source, and a junction face connecting the primary optical member to the output optical member, the primary optical element being a one-piece component, and an optical projection system arranged to project onto the ground, using the light emitted by the light source and collected by the primary optical member, an image of the junction face of this primary optical member, the primary optical member being arranged so that the image of its junction face that is projected onto the ground by the optical projection system is entirely delimited by substantially sharp edges.

* * * * *